United States Patent [19]

Marriott et al.

[11] Patent Number: 5,047,745

[45] Date of Patent: Sep. 10, 1991

[54] LAMINATIONS

[75] Inventors: George W. Marriott; Trevor Hirst, both of Wiltshire, United Kingdom

[73] Assignee: Linton and Hirst Limited, Swindon, England

[21] Appl. No.: 385,853

[22] Filed: Jul. 26, 1989

[30] Foreign Application Priority Data

Jul. 27, 1988 [GB] United Kingdom .............. 8817875.1
Dec. 30, 1988 [GB] United Kingdom .............. 8830408.4

[51] Int. Cl.[5] .......................... H02K 1/06; H01F 27/26

[52] U.S. Cl. ...................................... 310/217; 29/609; 336/212; 336/216

[58] Field of Search .................. 310/42, 217; 336/212, 336/216, 217, 234, 210; 29/607, 609; 335/297

[56] References Cited

U.S. PATENT DOCUMENTS 3,587,020 6/1971 Waasner ........................ 336/216 X

FOREIGN PATENT DOCUMENTS 028494 5/1981 European Pat. Off. ............ 336/216
2144951 3/1972 Fed. Rep. of Germany ...... 336/216
2139010 3/1973 Fed. Rep. of Germany ...... 336/216
2711855 9/1978 Fed. Rep. of Germany ...... 336/217
1550392 11/1968 France ................................ 336/216
1558102 1/1969 France ................................ 336/216
62-285407 12/1987 Japan ................................. 336/217
2019104 10/1979 United Kingdom ................ 336/216

*Primary Examiner*—Thomas J. Kozma
*Attorney, Agent, or Firm*—Richard M. Goldberg

[57] ABSTRACT

Packs of laminations and a method of assembling the packs of laminations to make a core of an electromagnetic device such as a transformer or motor are described. First and second packs of complementary laminations (12, 14) are provided that fit relatively freely together and have interfitting formations e.g. dovetail formations (16) and projections (18). Preferably adjacent laminations of each pack are attached. The first and second packs of laminations (12, 14) are held positively together in mechanical contact e.g. in a jig. The formations (18) on one or both of the laminations are then deformed to engage the formations (16) of the other lamination to clamp the first and second packs of laminations (12, 14) together. In an alternative form the first and second packs of laminations clip together.

24 Claims, 10 Drawing Sheets

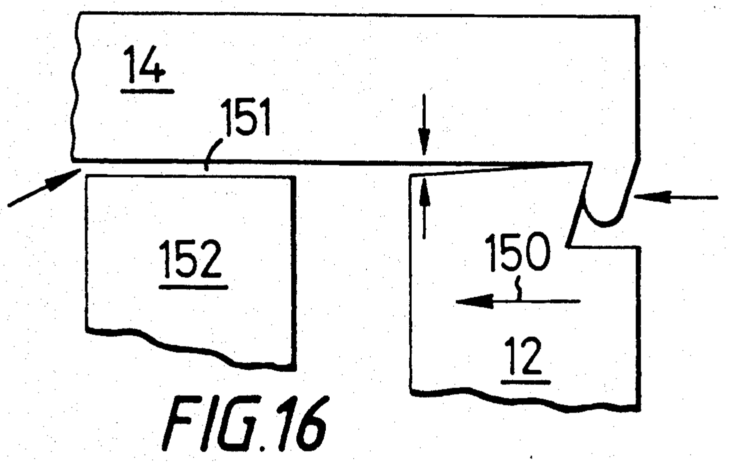
FIG.16
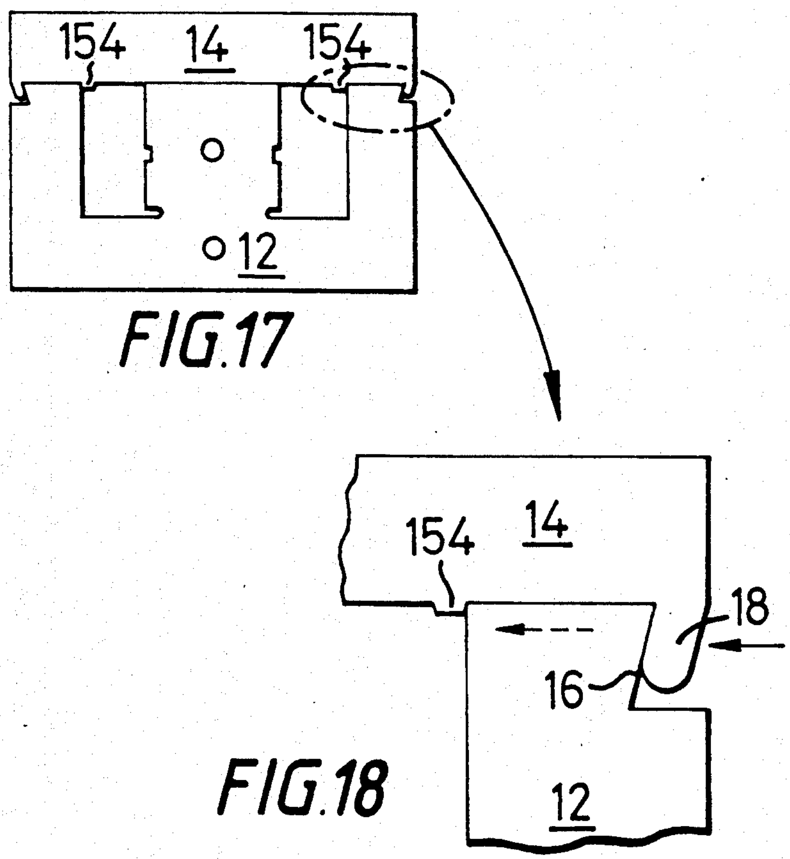
FIG.17
FIG.18

LAMINATIONS

This invention relates to improved laminations for electromagnetic devices for making up magnetic cores thereof, to packs of said laminations and to methods of assembling said packs to form magnetic cores.

Electromagnetic devices e.g. transformers and electric motors commonly have cores made up of individual laminations which may take the form of a butted stack, an interleaved stack or a so-called "Unilam" stack (see Patent No's GB-A-1466878, 1466879 and 1466880). A variety of ways have been used to hold the laminations together to make a core for the device. They have been bolted together. They have been welded together. They have been adhered together. They have been enclosed within a retaining frame. But all these methods are costly because they involve additional components and/or add to the time and number of operations needed to assemble the core.

It has been proposed in U.S. Pat. No. 4,594,295 to provide cut sheet metal laminations that may be force fitted together to avoid transformer noise at high load/temperature working conditions.

Thus one of the laminations has small narrow projections that provide a force or interference fit into corresponding recesses of a complementary lamination. But it inherent in the force fit method of assembly that the complementary parts resist assembly, and any resulting incompleteness in the mechanical contact between the assembled parts increases the magnetic reluctance of the device, and corresponding loss of efficiency. Furthermore the said US Patent does not rely on force fitting as a sole means for holding the laminations together but also fastens the laminations by welding as is conventional in the art. Force fitting is also described in Specification No's DE-A-2744711, 3008598 and 3008599. Our Patent Specification No. EP-A-0028494 describes and claims F-lamination parts for use in the magnetic cores of transformers having projections and recesses that are subject to an interference fit or act as spring clips. In the latter form, restoring force in the side limbs of the laminations holds the overlapping centre limbs forming the core tightly against one another, providing a frictional resistance to disassembly of the part.

It is an object of the invention to provide a novel structure for laminations of electromagnetic devices that enable them to be assembled together simply and inexpensively in few operations and with minimal loss in performance.

It is a further object of the invention to provide a novel structure for laminations that can be cut from sheet substantially without scrap and that do not have overlapping limbs that frictionally oppose disassembly.

In one aspect the invention provides a lamination assembly for an electromagnetic device comprising first and second packs of complementary laminations that fit together and have portions that are resiliently or permanently deformable to clamp the first and second packs of laminations together, subject to the proviso that when the portions are resiliently deformable their limbs abut but do not overlap.

In one form the first and second packs fit relatively freely together and the portions clamp the packs together by permanent deformation.

The facility to assemble the laminations freely together enables them to be offered together and held in good mechanical contact by an external clamping force until the deformable portions are mechanically deformed to hold the packs together.

The invention also provides a lamination assembly for an electromagnetic device comprising first and second packs of complementary laminations that fit together and have portions that are resiliently or permanently deformable to clamp the first and second packs of laminations together, the laminations of the first and second packs occurring in pairs whose outlines are such that they nest within one another and can be cut from sheet substantially without waste.

In a further aspect, the invention provides a method of assembling laminations of an electromagnetic device, which comprises:

providing first and second packs of complementary laminations that fit relatively freely together and have interfitting formations;

holding the first and second packs of laminations positively together in mechanical contact; and deforming said formations on one or both of the laminations to engage the interfitting formations of the other lamination to clamp the first and second packs of laminations together.

The interfitting formations of the first and second packs of laminations may simply give rise to a frictional clamping force when deformable ones of them are deformed onto non-deforming others of them but preferably they are profiled so that deformation of said formations mechanically fastens the first and second packs together. In the latter case, the interfitting formations of the first and second packs of laminations advantageously have a dovetail or other profile such that deformation of said formations positively urges the first and second packs of laminations together. The dovetail is advantageously formed on the non-deforming seat formation but it may also be formed on a deformable ear formation.

Preferably the free interfitting is provided by a clearance fit but it may also be provided by a transition fit, line contact between the male and female parts offering little resistance to assembly. Any force needed to assemble the stacks of laminations together should be relatively small compared to the available clamping force.

Again, if the male and female parts are a tight transition fit, the properties of the product may be acceptable if the resistance reduces during the last part of the travel of the first and second packs of laminations towards the fully abutted position.

In a more specific aspect, the invention provides a lamination assembly for an electromagnetic device formed by fastening together first and second packs of complementary laminations, wherein:

a) the laminations of each pack have spaced convergent faces; and b) the laminations of each pack have spaced clamping projections for fitting onto the convergent faces and that when inelastically deformed or crimped onto said faces mechanically lock the first and second packs together.

The invention further provides a pack of laminations for use in an electromagnetic device, said laminations having spaced convergent faces for receiving projections of laminations of a complementary pack that when deformed onto said faces lock the packs of laminations together.

The invention yet further provides a pack of laminations for use in an electromagnetic device, said laminations having spaced clamping projections for fitting onto convergent faces of laminations of a complementary pack and that when deformed onto said faces mechanically lock the laminations together.

The above method of assembly can be used for loose laminations and torsionally flexible stacked laminations. Thus a rigid pack of E-laminations may be assembled to a pack of I- laminations which is flexible e.g. because the undivided laminations are held together by a single peg. With this flexibility the I-laminations easily accommodate any irregularities in the E-laminations and good mechanical and magnetic contact is obtained. The use of two or more pegs for both E-laminations and I-laminations is within the invention.

In a further aspect the invention provides a lamination for use in an electromagnetic device having spaced convergent faces for receiving projections of a complementary lamination that when deformed onto said faces lock the laminations together.

In another aspect, the invention provides a lamination for use in an electromagnetic device having spaced clamping projections for fitting onto convergent faces of a complementary lamination and that when deformed onto said faces mechanically lock the laminations together.

The invention yet further provides a lamination assembly for an electromagnetic device comprising first and second packs of complementary laminations that fit together and have portions that are resiliently or permanently deformable to clamp the first and second packs of laminations together, one of the packs of laminations having abutment formations that give rise to a reaction to the force on limbs of the other pack of laminations during clamping and at least partly prevent permanent deformation of said limbs of said other pack.

In the alternative form of the invention the first and second packs are spring clipped together. In this form, side limbs of one of the packs may be deformed inwardly during clipping together, but preferably deform outwardly so that a transformer core on a centre limb of said one pack is not compressed as the first and second packs are clipped together.

Various forms of the invention will now be described, by way of example only, with reference to the accompanying drawings, in which:

FIG. 1*a* is a front view of components of an electrical transformer prior to assembly, and FIGS. 1*b*, 1*c* and 1*d* are respectively a central transverse section of a pack of I-laminations, a transverse section of a core and an end view of a pack of E-laminations all being components that appear in FIG. 1;

FIG. 2*a* is a front view of a transformer assembled from the components shown in FIG. 1, FIG. 2*b* is an enlarged detail of one side of the transformer core at an interface between the I- and E-laminations prior to attachment of them together and FIGS. 2*c* and 2*d* are end views of the transformer showing alternative core structures;

FIG. 3 is a front view of the transformer during assembly.

FIGS. 4*a*, 4*b* and 4*c* are enlarged details of one side of the transformer core at an interface between I- and E-laminations after attachment together and showing alternative notch profiles;

FIGS. 5*a*, 5*b* and 5*c* are enlarged details of one side of the transformer core at an interface between an I-and an E-lamination showing the use of different notch angles and crimp blade profiles;

FIGS. 6*a* to 6*e* are front views of typical lamination assemblies for a variety of transformers and chokes assembled according to the invention;

FIG. 7 is a diagrammatic front view of a core of a shaded pole motor assembled according to the invention;

FIGS. 8*a* and 8*b* are front and side views of an interleaved stack of I- and E-laminations according to the invention and FIG. 8*c* is a view of the I- and E-laminations from which the interleaved stack is formed;

FIGS. 9 and 10 are front views of transformer laminations showing an alternative form of attachment;

FIGS. 11, 11*a* and 12, 12*a* are detail views showing alternative notch and projection profiles for use in the laminations of FIGS. 9 and 10;

FIGS. 13 and 13*a* are detail views showing a yet further notch and projection profile;

FIGS. 14 and 14*a* are detail views showing a yet further projection profile for use with a dovetail notch;

FIGS. 15*a* to 15*c* are a front view of E- and I-transformer laminations and detail views showing their method of assembly according to a further form of the invention and FIG. 15*d* is a detail showing an alternative profile for the interlocking formations.

FIG. 16 is a fragramentary front view of E- and I-transformer laminations showing development of an air gap;

FIGS. 17 and 18 are a front and enlarged detail view of a further form of E- and I- transformer laminations showing a method of assembly according to a yet further form of the invention.

Figure 1A:
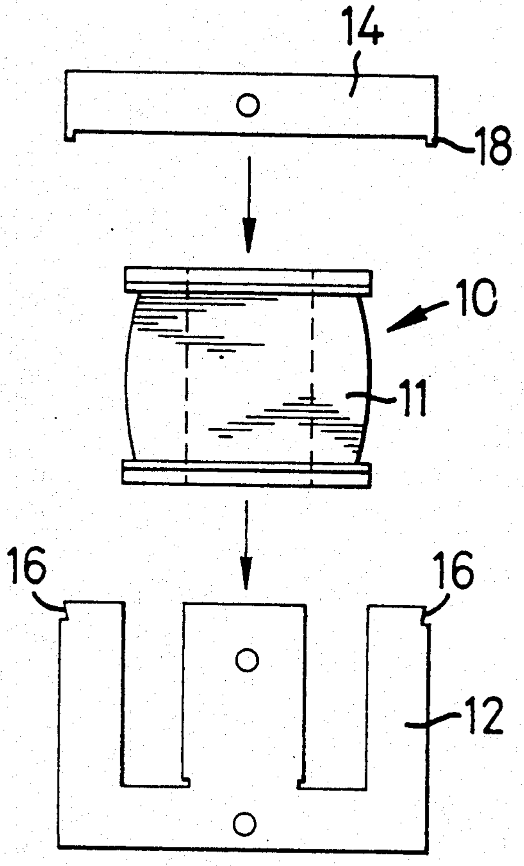
Figure 1B:
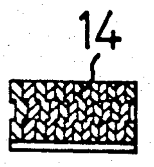
Figure 1C:
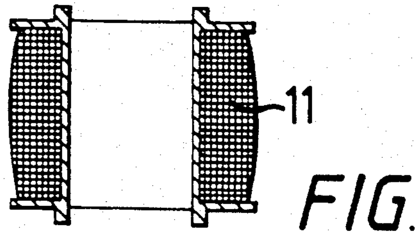
Figure 1D:
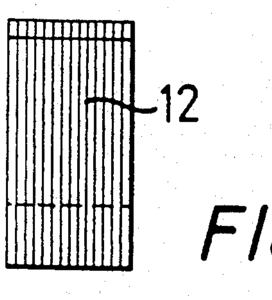

In FIG. 1*a* and FIGS. 1*b*, 1*c* and 1*d* a transformer 10 has windings 11 and a core assembled from an E-lamination pack 12 and an I-lamination pack 14. The laminations of the E-lamination pack 12 are held together by a pair of stamped-in spigot and socket fasteners. The upper extremities of the E-laminations of the pack 12 are formed on the outer edges thereof with dovetail formations 16 and the I-laminations of the pack 14 are formed with deformable projections or ears 18. The dovetail formations 16 and the ears 18 are desirably formed on the respective laminations during stamping or pressing thereof. The size or length and width of the lugs and the size and profile of the dovetail groove vary depending on the size, weight and stack length of the intended transformer assembly. For assembly of the transformer the E-lamination pack 12 is placed in a jig, the windings 11 are placed on the centre limb of the E-laminations and the I-lamination pack is placed onto the E-lamination pack and is a loose fit thereon. Clamping force F is applied to urge the packs 12,14 into good mechanical contact, which is assisted if the I-pack 18 is torsionally flexible. Good mechanical contact avoids interruption of the magnetic flux path in the assembled core and hence loss of efficiency.

Figure 2A:
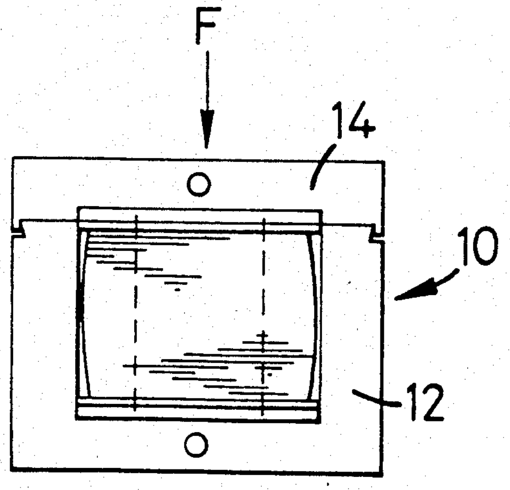
Figure 2B:
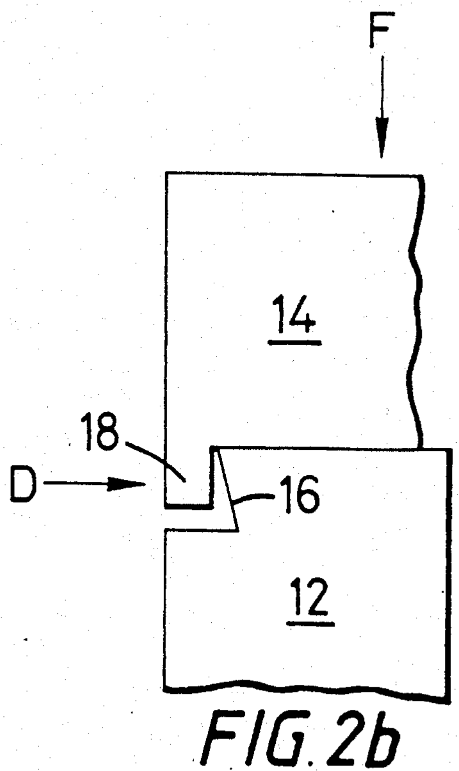
Figure 2C:
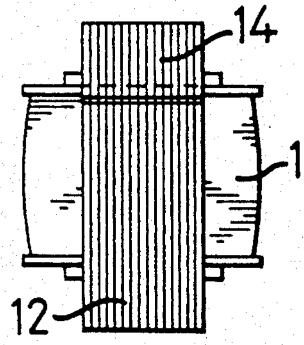

An inwards deformation D (FIG. 2*b*) is then caused by impact e.g. of appropriately profiled crimping fingers onto the ears 18 to seat them onto the dovetail formations and to fasten the E- and I-lamination packs 12, 14 together mechanically. Because of the dovetail formations, the act of deformation also pulls the I-stack 14 firmly against the E-stack 12. The resulting attachment between the lamination packs 12, 14 is sufficiently strong and permanent that no additional method of attachment is needed, though adhesive or other conventional means of holding the packs together may be employed if desired. The assembled transformer has the appearance shown in FIGS. 2*a* and 2*c*.

The above construction of pre-stacked crimped transformer laminations has a number of advantages during assembly. No welding, laminating or selector "butt stack" machine is required and assembly can be carried out inexpensively and in high volume. There is substantially no scrap from bent, bowed or damaged loose laminations and no out-of balance stocks e.g. from having to scrap a complementary E-lamination when an I-lamination is scrapped. Production control is easy, and the stacks can be disassembled and re-crimped if required whereas a welded lamination assembly cannot be taken apart and reassembled if a fault occurs. Loose laminations can lean during conventional welding and clamping operations, giving a reduced butt register which can affect the electrical performance of the lamination assembly. Pre-stacked E- and I-lamination stacks in which adjacent laminations are connected together by pegs or the like are square to each other giving a good butt register, especially where the I-stack has a single locking peg and is torsionally flexible as disclosed in our Patent Specification No. GB-A-2206453.

Figure 2D:
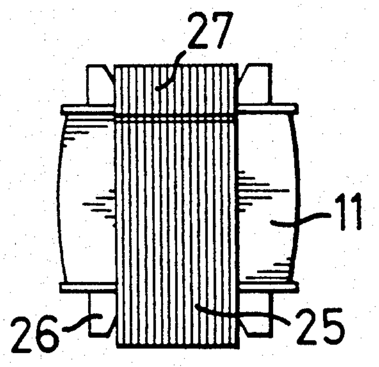

In a variation (FIG. 2*d*) the E-laminations 25 are loose rather than adhered to one another in a pack and are held together by locator formations 26 of the bobbin 11. The laminations 25 are attached to a pack of I-laminations 27 as described above. The E-laminations can also be stacked laminations held together by one or more impingement pegs.

Figure 3:
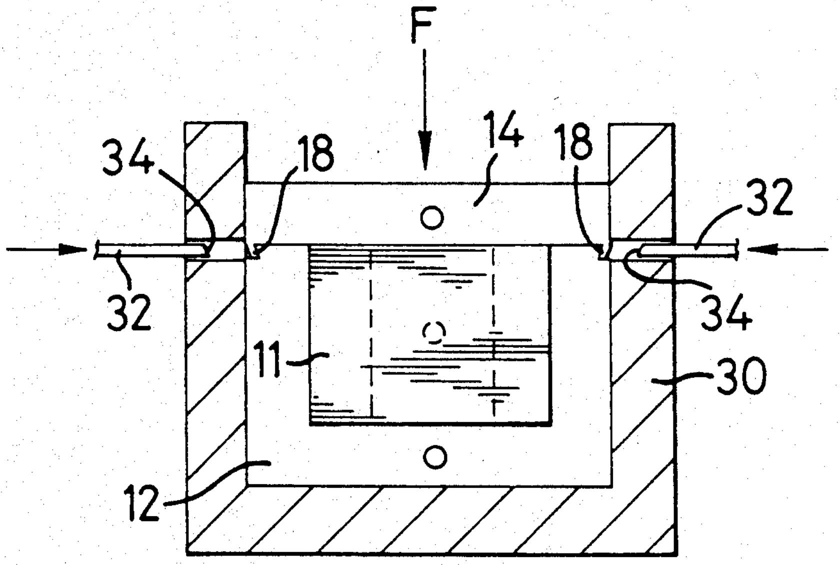

FIG. 3 shows diagrammatically the transformer winding 11 and laminations 12, 14 in a jig 30 during assembly thereof, crimping blades 32 having angled end faces 34 impinging on the projections or ears 18 to bring about the required inward deformation thereof.

Figure 4A:
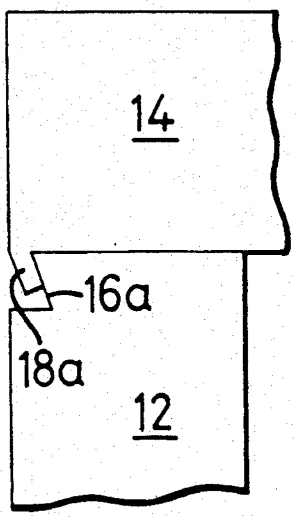
Figure 4B:
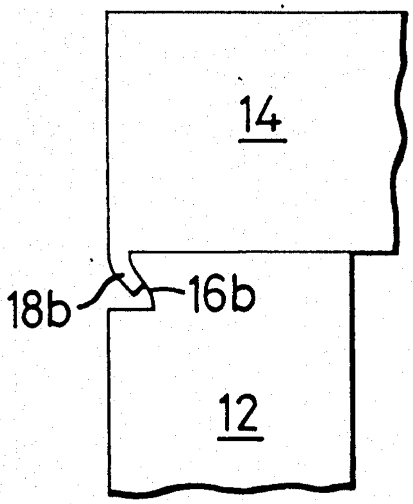
Figure 4C:
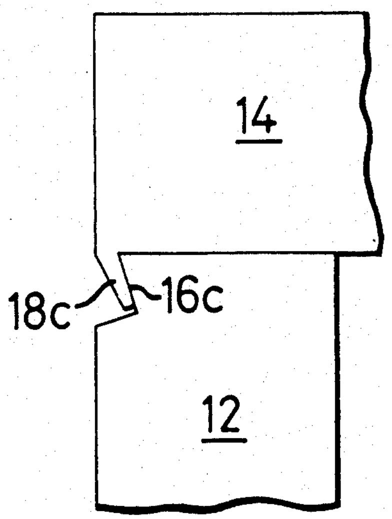

Various notch and ear profiles are shown in FIGS. 4*a*–4*c*. In FIG. 4*a* the notch 16*a* is a plain dovetail and the ear 18*a* extends part way e.g. slightly over half way along it. In FIG. 4*b* the dovetail surface of the notch 16*b* is doubly curved. In FIG. 4*c* the notch 16*c* is again angular, but its lower face is inclined away from rather than parallel to the end face of the E-lamination 12 and the ear 18*c* extends substantially the whole way along the dovetail notch.

Figure 5A:
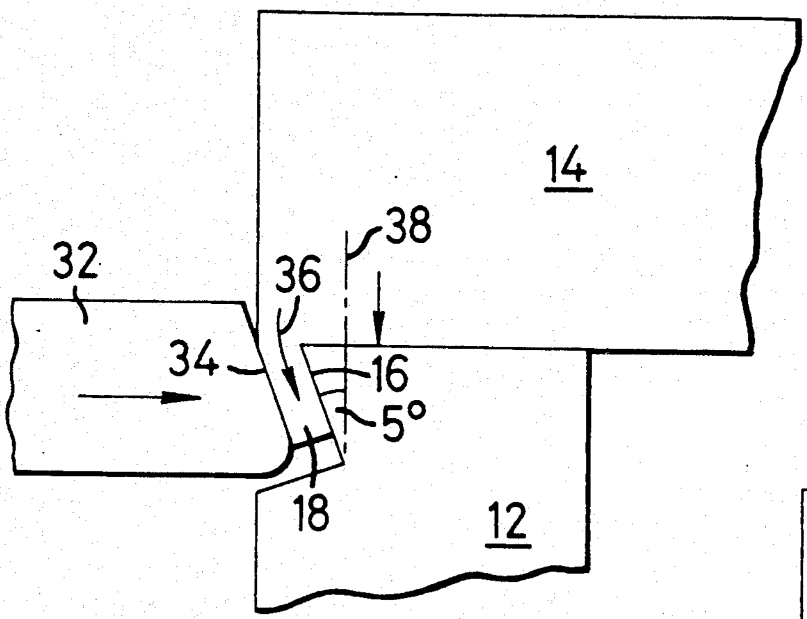
Figure 5B:
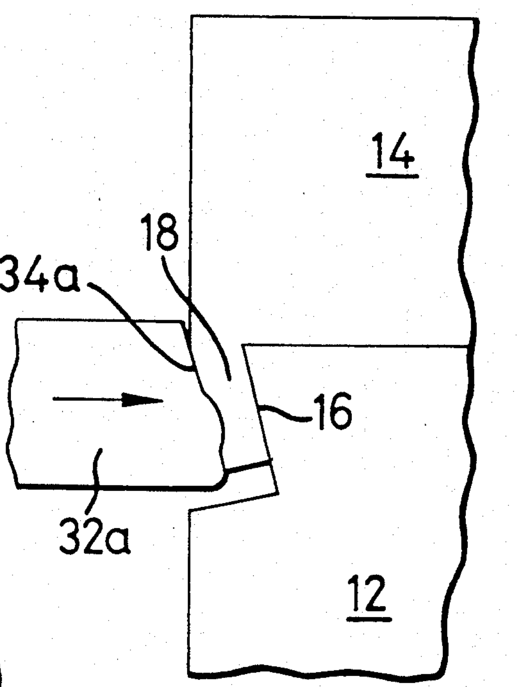
Figure 5C:
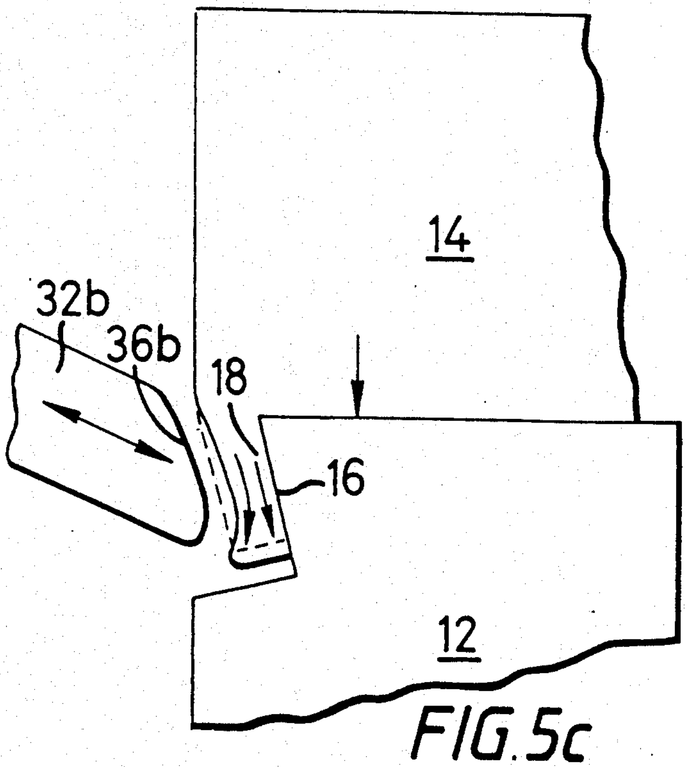
Figure 6A:
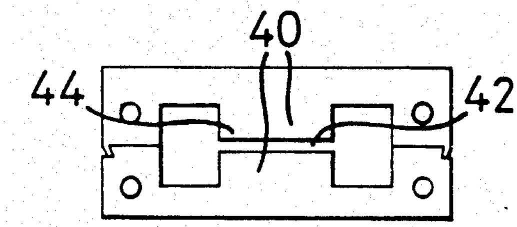
Figure 6B:
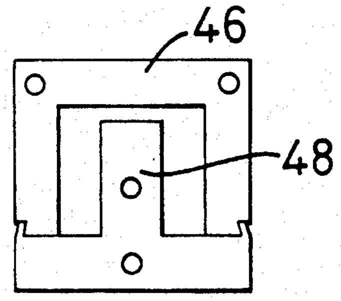
Figure 6C:
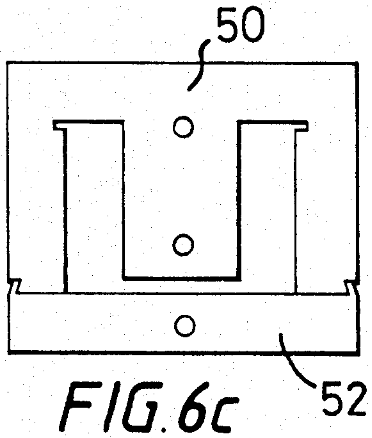
Figure 6D:
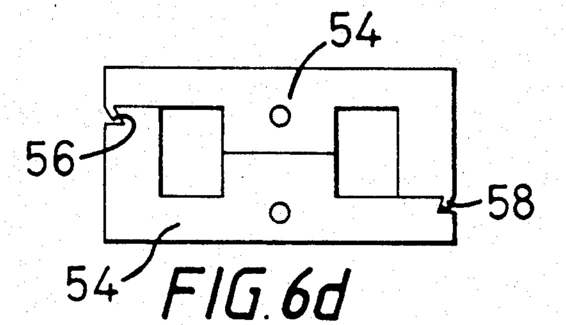
Figure 6E:
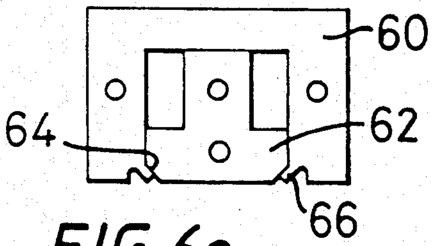

In FIG. 5*a* the blade 32 has a plain inclined surface 34. The impact of blade 32 on the ear 18 both deforms the ear inwardly and causes a slight extension thereof as indicated by arrow 36. The angle between the working face of the dovetail notch 16 and a normal 38 to the end surface of the E-laminations 12 is advantageously above about 5° and may have whatever value is needed to bring about secure attachment of the lamination packs 12, 14. Angles above and below 5° may be used, the angle being selected in any individual case depending on the size and weight of the intended core structure. The arrangement of FIG. 5*b* is similar except that the end face 34*a* of the blade 32*a* is ribbed as shown. In FIG. 5*c* the blade 32*b* has an angled line of action to increase the component along the notch 16 and has a convexly curved end face 36*b* to maximise crimp and extrusion pressure on the ear 18.

In FIG. 6 there are shown various possible core configurations. In FIG. 6*a* there is shown a choke core having a pair of E-laminations 40 with an air-gap 42 between the central limbs 44. FIG. 6*b* shows another choke core formed by a U-lamination 46 and a T-lamination 48. In FIG. 6*c* a third choke core is formed by E-lamination 50 and I-lamination 52. FIG. 6*d* shows a transformer core formed by a pair of F-laminations 54. In this structure it will be noted that one of the laminations 54 has the notches or recesses 56 and the other has the clamping ears 58. FIG. 6*e* shows a further transformer core formed by a U-lamination 60 and a T-lamination 62. In this structure, inclined surfaces 64 on the T-lamination 62 receive clamping ears 66 on the U-lamination 60.

Figure 7:
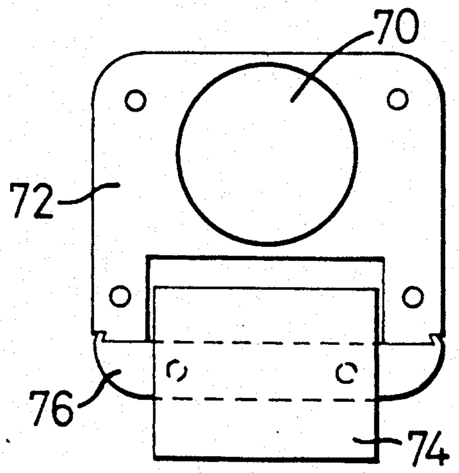

In FIG. 7 a structure is shown for a shaded pole electric motor having a rotor 70 that rotates in a stator defined by U-laminations 72. A pole bobbin 74 on lamination pack 76 is attached thereto by clamping ears and recesses as previously described.

Figure 8A:
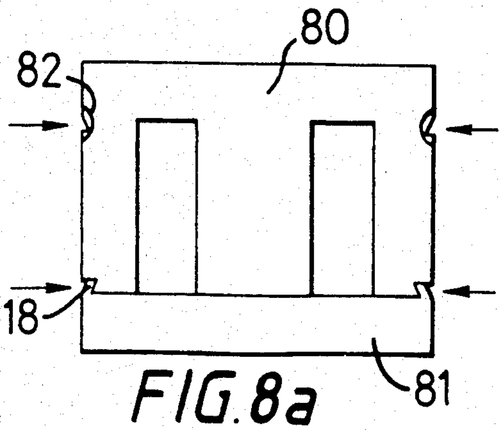
Figure 8B:
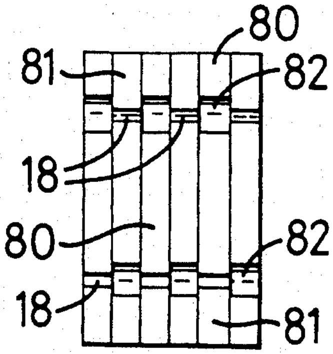
Figure 8C:
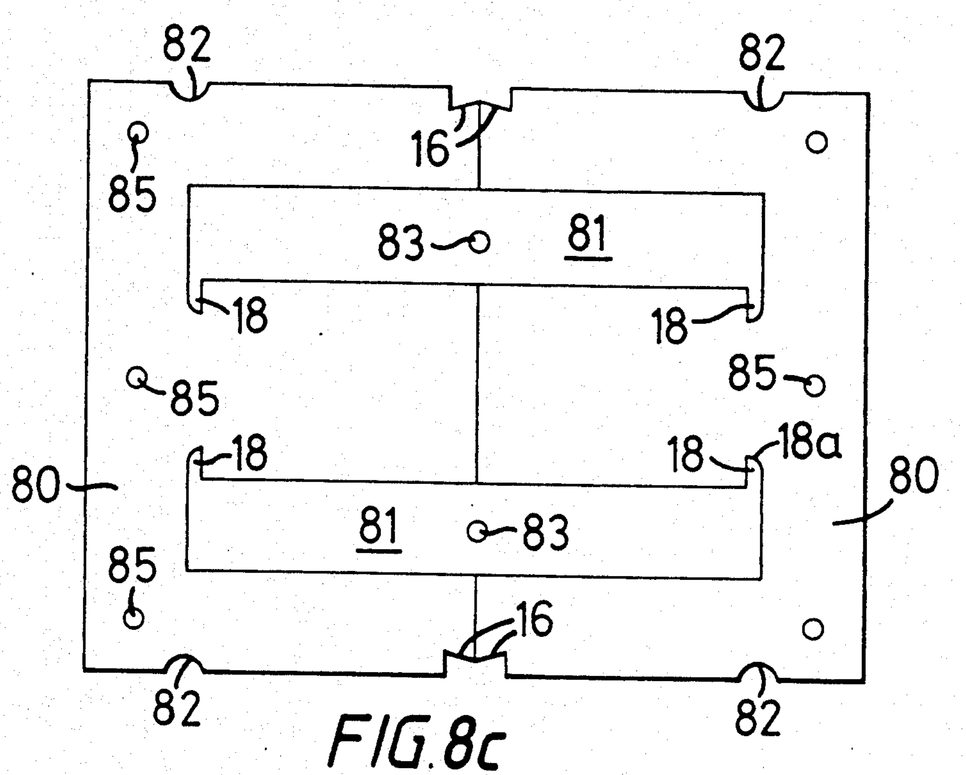

In FIGS. 8*a*–8*c* there is shown an arrangement for an interleaved stack of E and I laminations 80,81. As seen in FIG. 8*c* which shows the cut-lines on blank steel sheets the I-laminations 81 nest within the E-laminations 80 and can be cut from sheet by a progressive forming tool substantially without waste. The sides of the E-laminations 80 are formed with recesses 82 typically of semi-circular shape which, as seen in FIG. 8*b*, alternate with the ears and recesses 16,18 in the assembled interleaved stack. The ends 18*a* of the ears 18 are convexly curved to produce correspondingly curved recesses in the E-member 18. The curvature is selected to minimise disturbance to the flux path in the assembled transformer core. The I-laminations 81 and the E-laminations 80 have spigot and socket connectors 83, 85 whose number and location is selected depending upon the size and other characteristics of the core being made.

Figure 9:
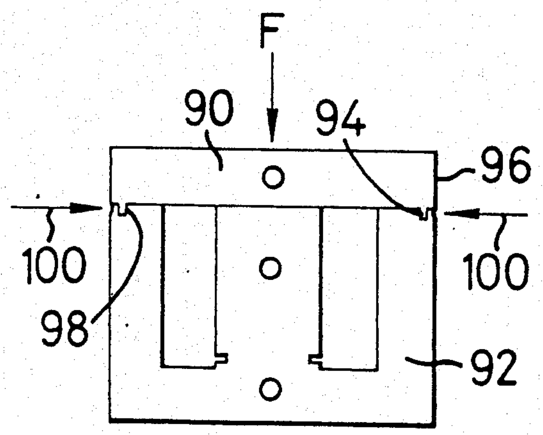
Figure 10:
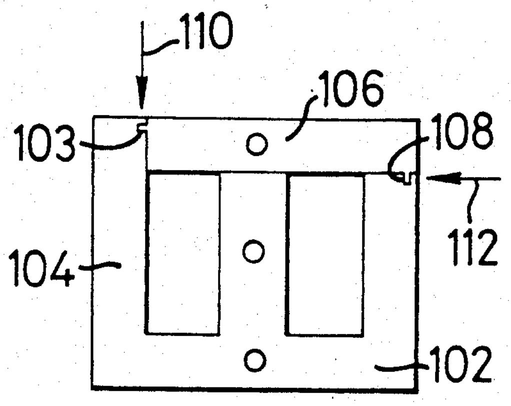

In FIG. 9 an I-lamination 90 fits to an E-lamination 92 to form a transformer core. The I-lamination 90 has depending projections or ears 94 offset slightly inwards from its ends 96 that fit into notches 98 in the end faces of the E-laminations 92. Assembly is by crimping inwards the thin material of the outer faces of the notches 98 as shown by arrows 100 using crimping blades of the kind previously described. In FIG. 10 a "Unilam" type core is formed in which an E-lamination 102 having an extended side limb 104 receives an abbreviated I-lamination 106. The E-lamination 102 has a slot 103 in the inner side face of its extended side limb 104 and a slot 108 in the end face of its other side limb that receive corresponding projections or ears on the I-laminations 106. It will be noted that the slots 103, 108 and the corresponding lines of action of the necessary crimping blades are directed generally at right angles to one another as shown by arrows 110, 112.

Figure 11:
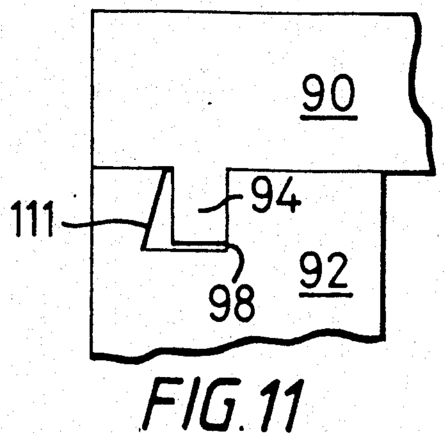
Figure 11A:
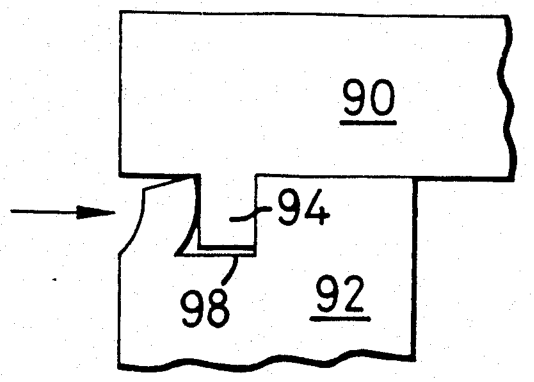
Figure 12:
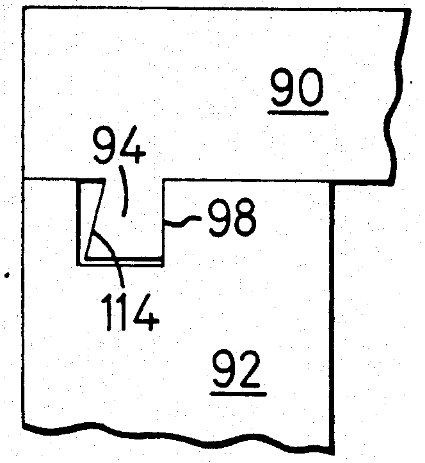
Figure 12A:
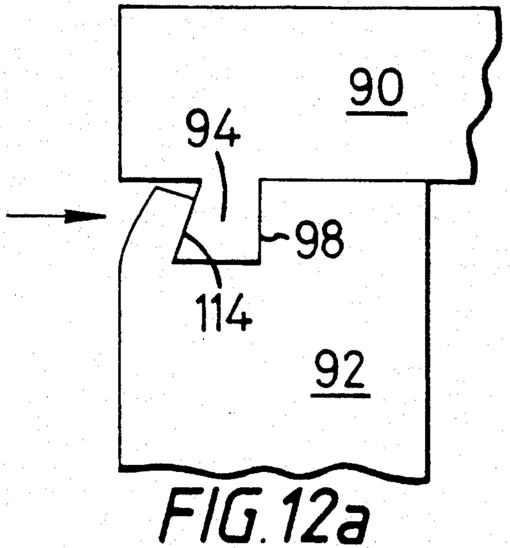

Details of the possible slot and ear formations of the I- and E-laminations are shown in FIGS. 11, 11*a* and 12,12*a* which are respectively before and after deformation. In FIG. 11*a* the dovetail surface 111 is formed on the deformable outer portion of the slot 98 and in FIG. 12*a* it is formed at 114 on the outer surface of ear 94.

It will be appreciated that the fastening system described above has a number of advantages. It enables a core from an electromagnetic device to be assembled rapidly and inexpensively. The laminations can be made nearly without waste. The method can be used for assembly of loose lamination transformers and stacked lamination transformers or transformers having laminations which are partly stacked and partly loose or interleaved lamination transformers. Tests have shown that the efficiency of an assembled core according to the invention is substantially the same as or only slightly less than that of a conventionally assembled core.

Figure 13:
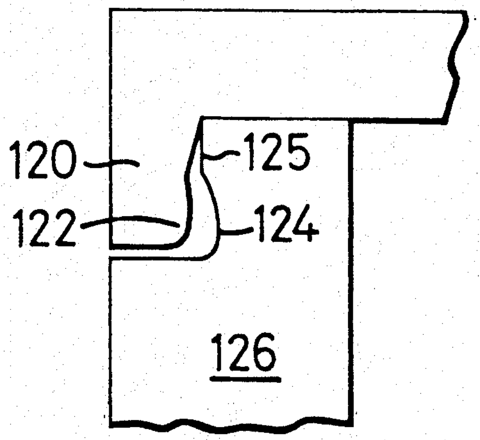
Figure 13A:
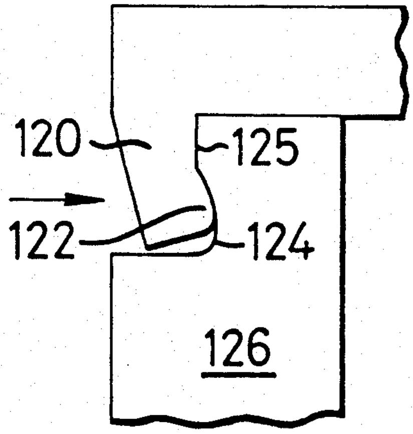

FIGS. 13 and 13*a* show a yet further profile for a slot and ear which can be used when high retaining force is required. One pack of laminations has an ear 120 having a convex blind face 122 which is deformable into contact with a concavity 124 in the other pack of laminations 126. The convex blind face 122 initially passes face 125 of lamination 126 with clearance but after deformation mechanically interlocks therewith.

Figure 14:
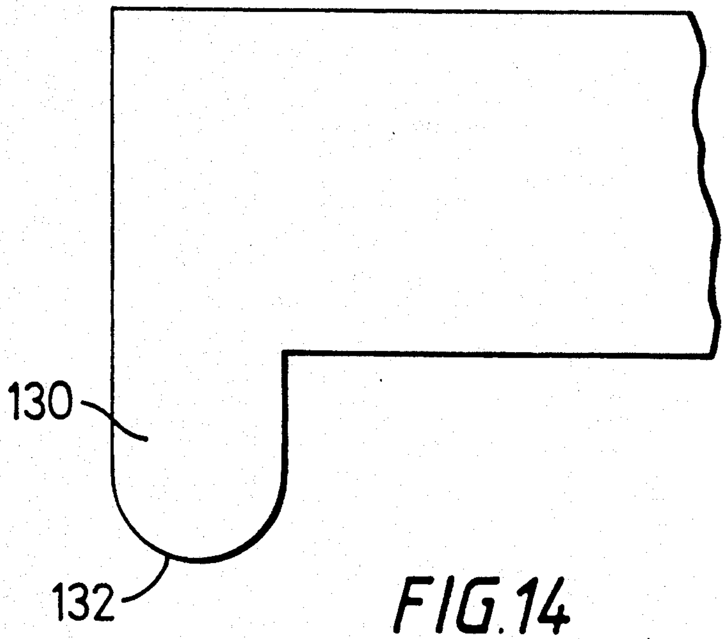
Figure 14A:
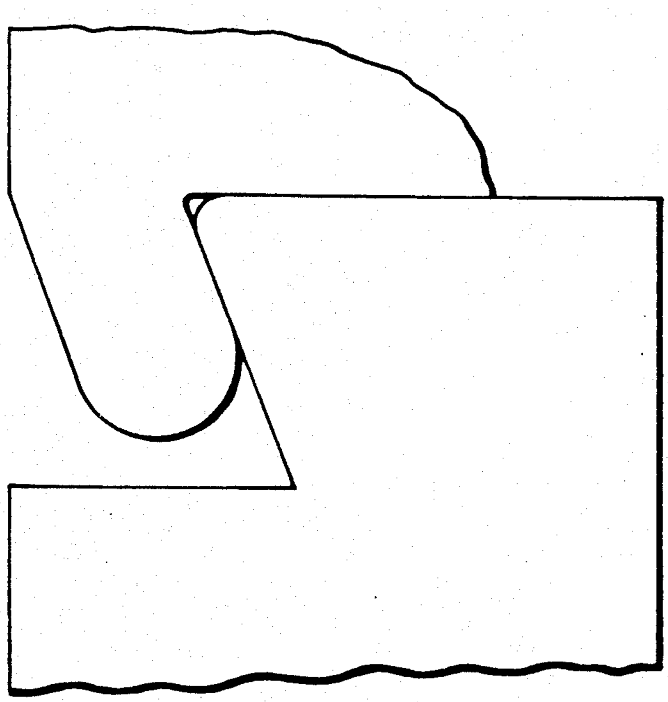

FIGS. 14 and 14*a* show a notch profile in which one pack of laminations has ears 130 having rounded ends 132. These ear profiles are effective from the standpoint of clamping the lamination packs together but enable easier tool manufacture and reduce tool wear during production.

Figure 15A:
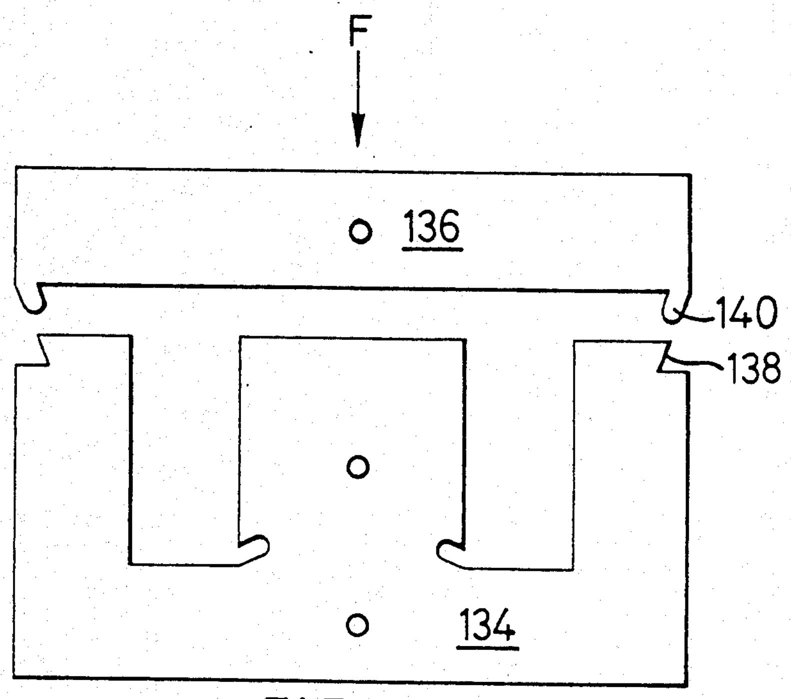
Figure 15B:
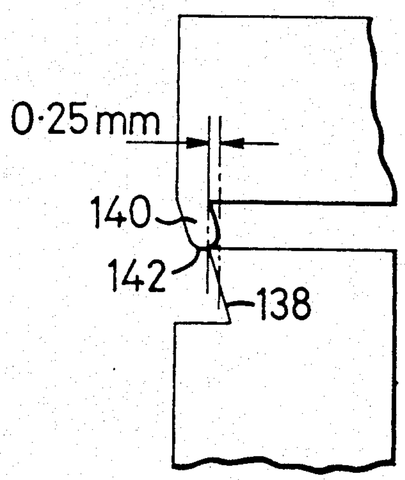
Figure 15C:
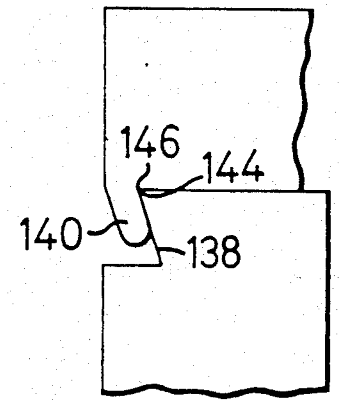
Figure 15D:
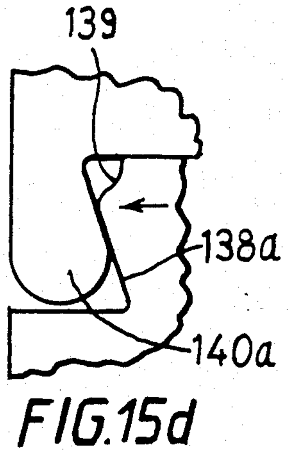

In FIGS. 15*a*–15*c*, an E-stack of laminations 134 and I-stack of laminations 136 have complementary dovetail formations 138 and ears 140. Rounded ends 142 or ends of other cam profile are formed on the ears 140. The ears 140 are angled similarly to or slightly less than the angle of the dovetail formation. The distance across the tips of dovetail formations 138 is typically 0.5 mm greater than the gap between the inner faces of ears 138 although this dimension may vary depending upon lamination size and material. If pressure F is applied between stacks 134, 136 the two stacks can be clipped together. The I-stack 136 does not flex, but the legs of the E-stack 134 flex sufficiently (without permanent deformation) to allow the two stacks to be locked together. The force F is similar in magnitude to the force required to bring about ear crimping in the earlier embodiments and the I- and E- laminations are butted together sufficiently tightly to provide adequate electrical performance. The dovetail formations 138 are formed with corners 142 of larger radius than the internal corners 144 of the ears 140 or are formed with bevelled corners so that the stacks 134, 136 come into abutment without interference. With this arrangement, effective abutment of stacks 134, 136 in production is not jeopardised by tool wear. In a variation (FIG. 15*d*) the ears 140*a* have enlarged bulbous ends when viewed in profile and the dovetail formations 138*a* are relieved to define lead-in surfaces 139 that cam the side legs of the stack 134 inwardly as the stacks 134, 136 are pushed together.

As is illustrated in FIG. 16, a problem can arise from deflection of the outer limbs during crimping of stacks of laminations having relatively long limbs or made from material less than 0.5 mm thick e.g. of thickness 0.2 to 0.5 mm. If the outer limbs 16 deflect during crimping as indicated in FIG. 16 by the arrow 150 an air gap 151 can form between the centre limb 152 of the E- stack 12 and the I- limb 14. Development of an air gap 151 can result in a deterioration in the electrical performance of a transformer other than a choke-ballast transformer where an air gap is required. For transformers where it is desirable to prevent development of an air gap at the centre limb, means is provided for preventing inward deformation of the outer limbs of the E- stack (FIGS. 17 and 18). Such means may comprise a small raised nipple 154 on some or all of the laminations of the I- stack 14, the nipples 154 being located towards but spaced from the ends of the I- stack 14. When the stack of I-laminations 14 is placed on the stack of E-laminations 12, the outer limbs of the E lamination stack 12 fit between their respective nipples 154 and a respective ear 18. When the ears or lugs 18 are crimped into the dovetail 16 the small nipple 154 prevents the outer limbs of the E- stack from deflecting under the crimping pressure and in turn prevents development of undesired air gaps.

Figure 19A:
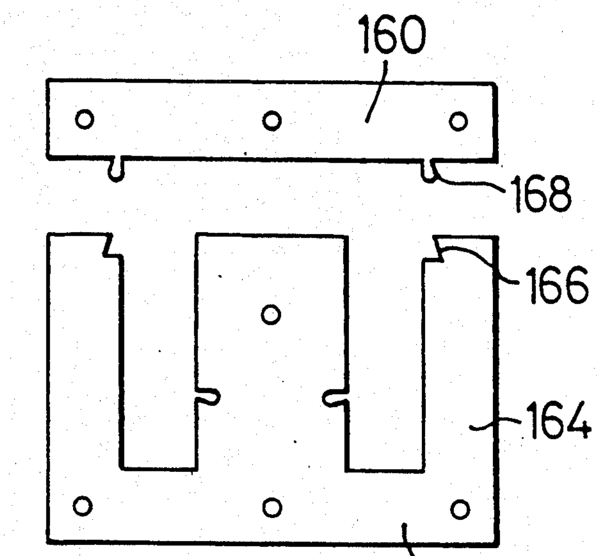
FIGS. 19*a*-19*c* are front views of a further form of the E- and I- transformer laminations showing their method of assembly.
Figure 19B:
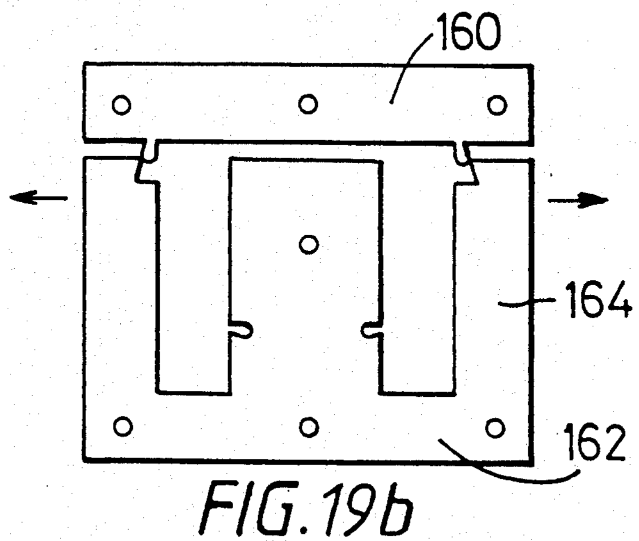
Figure 19C:
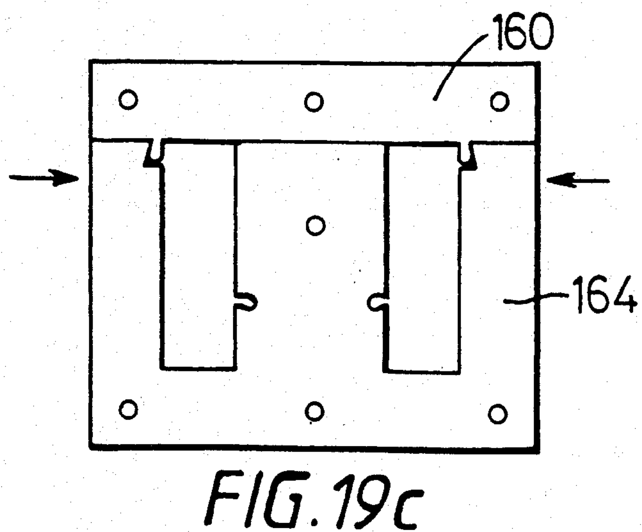

FIGS. 19*a*–19*c* show a further form of the invention in which an I-lamination stack 160 and an E-lamination stack 162 clip together by resilient outward deformation of side limbs 164 of the E-lamination stack. The side limbs legs 164 are formed at the ends on the inner edges with mortise formations 166 as shown in FIG. 19*a* and the I-lamination stack is formed with tenon formations or ears 168 spaced outwardly from its ends as shown. When the I-stack ears 168 make contact with the E-stack legs 164 (FIG. 19*b*) the legs 164 flex outwards as indicated by arrows to allow the I-stack ears 168 to pass and to nestle into the E-stack dovetail or mortise 166. When the I-stack 160 butts against the E-stack 162 the legs 164 relax without any permanent deformation firmly gripping the I-stack ears 168 and with the dovetail shape firmly holding the I-stack against the E-stack butt face (FIG. 19*c*).

What is claimed is:

1. A lamination assembly for an electromagnetic device comprising first and second packs of complementary laminations that fit together, said first pack of laminations including at least one external face with a dovetail formation therein, and said second pack of laminations including at least one deformable projection thereon, each lamination in said second pack of laminations having a first major surface lying in a plane and each projection thereof being of substantially rectangular cross-sectional configuration in a plane parallel to the plane of the respective lamination in said second pack of laminations each interfitting with and engaging with one said dovetail formation, and each said deformable projection being bent inwardly toward each respective said dovetail formation and permanently engaging said dovetail formation and thereby permanently locking said first and second packs of laminations together, with each said projection having an exterior surface which is inclined to the respective external face.

2. A lamination assembly according to claim 1, wherein adjacent laminations of the first and of the second pack are fastened together.

3. A lamination assembly according to claim 2, wherein at least one of the packs of laminations is torsionally flexible.

4. A lamination assembly according to claim 1, wherein the external surface of each said projection is directed inwardly at an angle of at least 5° to the respective exterior face of the pack of laminations.

5. A lamination assembly according to claim 1, wherein the second pack has outer limbs that contact the first pack adjacent abutment formations of the first pack that serve to limit inward deformation of the outer limbs during crimping of each said projection.

6. A lamination assembly according to claim 1, wherein at least one of the dovetail formation and corresponding projection has a lead-in shape that assists deformation of side limbs of the second pack as the first and second packs are clipped together.

7. A lamination assembly according to claim 1 wherein the first and second packs of laminations have formations arranged to bring about inward deformation of side limbs of the second pack as the first and second packs are clipped together.

8. A lamination assembly according to claim 1 wherein the first and second packs of laminations have formations arranged to bring about outward deformation of side limbs of the second pack as the first and second packs are clipped together.

9. A lamination assembly according to claim 1, wherein said first pack of laminations is a pack of E-laminations and said second pack of laminations is a pack of I-laminations.

10. A lamination assembly according to claim 9, wherein said I-laminations are torsionally flexible.

11. A lamination assembly according to claim 1, wherein each said projection has a width and a length, with the length being greater than the width.

12. A lamination assembly according to claim 11, wherein said length is at least approximately 1.5 times greater than said width.

13. A lamination assembly according to claim 1, wherein at least one of the first and second packs includes E-laminations.

14. A lamination assembly according to claim 1, wherein at least one of the first and second packs includes U-laminations.

15. A lamination assembly according to claim 1, wherein at least one of the first and second packs includes I-laminations.

16. A lamination assembly according to claim 1, wherein at least one of the first and second packs includes F-laminations.

17. A lamination assembly for an electromagnetic device comprising first and second packs of complementary laminations that fit together, said first pack of laminations including at least one external face with a dovetail formation therein said dovetail formation including surfaces which meet and have an acute angle therebetween and said second pack of laminations including at lest one deformable projection thereon each interfitting with and engaging with one said dovetail formation, and each said deformable projection being bent inwardly toward each respective said dovetail formation and permanently engaging said dovetail formation and thereby permanently locking said first and second packs of laminations together, with each said projection having an exterior surface which is inclined to the respective external face.

18. A lamination according to claim 17, wherein said first pack of laminations is a pack of E-laminations and said second pack of laminations is a pack of I-laminations.

19. A lamination assembly according to claim 18, wherein said I-laminations are torsionally flexible.

20. A lamination assembly according to claim 17, wherein each said projection has a width and a length, with the length being greater than the width.

21. A lamination assembly according to claim 20, wherein said length is at least approximately 1.5 times greater than said width.

22. A In a transformer, a lamination assembly comprising first and second packs of complementary laminations that fit together, said first pack of laminations including at least one external face with a dovetail formation therein, and said second pack of laminations including at least one deformable projection thereon, each lamination in said second pack of laminations having a first major surface lying in a plane and each projection thereof being of substantially rectangular cross-sectional configuration in a plane parallel to the plane of the respective lamination in said second pack of laminations, each interfitting with and engaging with one said dovetail formation, and each said deformable projection being bent inwardly toward each respective said dovetail formation and permanently engaging said dovetail formation and thereby permanently locking said first and second packs of laminations together, with each said projection having an exterior surface which is inclined to the respective external face.

23. In a choke, a lamination assembly comprising first and second packs of complementary laminations that fit together, said first pack of laminations including at least one external face with a dovetail formation therein, and said second pack of laminations including at least one deformable projection thereon, each lamination in said second pack of laminations having a first major surface lying in plane and each projection thereof being of substantially rectangular cross-sectional configuration in a plane parallel to the plane of the respective lamination in said second pack of laminations, each interfitting with and engaging with one said dovetail formation, and each said deformable projection being bent inwardly toward each respective said dovetail formation and permanently engaging said dovetail formation and thereby permanently locking said first and second packs of laminations together, with each said projection having an exterior surface which is inclined to the respective external face.

24. In an electric motor, a lamination assembly including first and second packs of complementary laminations that fit together, said first pack of laminations including at least one external face with a dovetail formation therein, and said second pack of laminations including at least one deformable projection thereon, each lamination in said second pack of laminations having a first major surfaced lying in a plane and each projection thereof being of substantially rectangular cross-sectional configuration in a plane parallel to the plane of the respective lamination in said second pack of laminations, each interfitting with and engaging with one said dovetail formation, and each said deformable projection being bent inwardly toward each respective said dovetail formation and permanently engaging said dovetail formation and thereby permanently locking said first and second packs of laminations together, with each said projection having an exterior surface which is inclined to the respective external face.

* * * * *